May 26, 1953 R. W. CARTER ET AL 2,640,193

RADIANT ENERGY SIGNALING SYSTEM

Filed Feb. 27, 1951 2 Sheets-Sheet 1

INVENTORS: R. W. CARTER
M. G. CURRIER
W. G. EMIG
K. V. GLENTZER

BY [signature]

ATTORNEY

May 26, 1953 R. W. CARTER ET AL 2,640,193

RADIANT ENERGY SIGNALING SYSTEM

Filed Feb. 27, 1951 2 Sheets-Sheet 2

INVENTORS: R. W. CARTER
M. G. CURRIER
W. G. EMIG
K. V. GLENTZER
BY [signature]
ATTORNEY Patented May 26, 1953

2,640,193

UNITED STATES PATENT OFFICE 2,640,193

RADIANT ENERGY SIGNALING SYSTEM

Robert William Carter, Milton Griffith Currier, William George Emig, and Kenneth Verley Glentzer, Chicago, Ill., assignors to American Telephone and Telegraph Company, a corporation of New York Application February 27, 1951, Serial No. 212,986

7 Claims. (Cl. 343—200)

Figure 1:
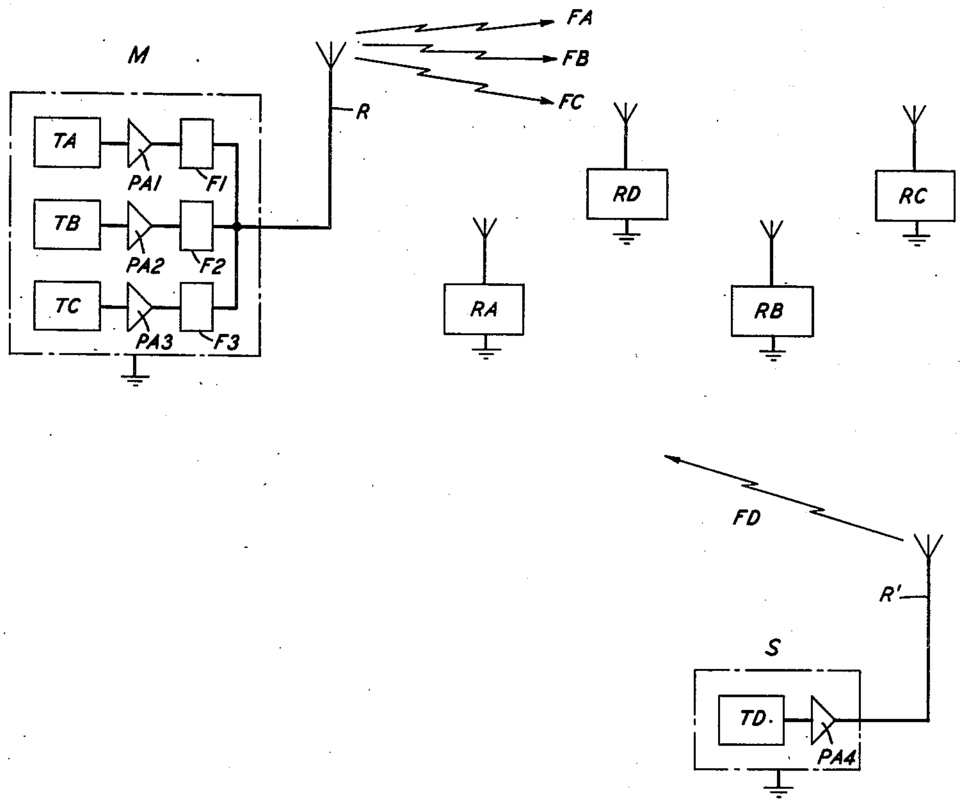

This invention relates to multichannel radiant energy signaling systems and, more particularly, to means for reducing the capture of a radiant energy receiver by intermodulation products of carrier waves transmitted over other channels than the channel assigned to the receiver.

Such capture of a radiant energy receiver results from the fact that ordinarily its first stages admit a much wider band of frequencies than its last stages due to the selectivity being cumulative within the receiver; that is, each successive stage in the receiver increases the over-all selectivity. Most of the over-all selectivity is developed in the stages that follow the first converter which, with the amplification stages that precede it, will admit undesired carrier energy extending over a wide band of frequencies. This undesired carrier energy frequently produces in the first converter intermodulation products having approximately the same frequency as the desired carrier. When these intermodulation products are produced during the absence of the desired carrier, they will pass through the succeeding stages of the receiver to create a false busy condition. If the receiver is of the frequency modulation type having a limiter stage and if the level of the received desired carrier is lower than the level of the intermodulation products, then the limiter will perform its characteristic function of discriminating in favor of the current of higher level with the result that the desired carrier will be substantially suppressed. Capture of a receiver in this manner is prevalent in urban mobile radiotelephone systems, particularly when a mobile receiver moves away from the transmitter at its base station into the immediate vicinity of other transmitters.

It has been previously discovered, as is described in an article entitled "A six-system urban mobile telephone installation with 60-kilocycle spacing" published on pages 1320 to 1323, inclusive, of the "Proceedings of the Institute of Radio Engineers" issue of November 1950, that the capture of a receiver in a multichannel radiant energy signaling system by carrier energy from those transmitters in the system that are not assigned to the receiver can be prevented by coordinating the starting circuits of the transmitters and by employing common point radiation of the carriers. Due to the coordination of the transmitter starting circuits, the starting of any one of the transmitters causes all of the transmitter starting circuits to become enabled with the result that all of the transmitters, regardless of whether they each have modulating signals applied to them, will generate their respective carriers simultaneously, each carrier having the same power level as each of the other carriers. In employing common point radiation of the carriers, the output circuit of each transmitter is coupled to radiating means located at a common transmitting point. Thus, any one of the receivers, regardless of changes in its location, will always be within equal transmitting range of all of the transmitters. Since all of the carriers are radiated simultaneously with equal strength from the common transmitting point, the limiter circuits in all the receivers will be saturated with their respective assigned carrier energy. This saturation of the limiters enables them to perform their characteristic selective function of excluding undesired energies, especially since the respective unassigned carriers will in no instance be received with greater intensity than the respective assigned carrier even though it may be unmodulated.

Although coordination of the transmitter starting circuits and common point radiation of the carriers will protect a receiver in a multichannel system from being captured by carrier energy from those transmitters in the system that are not assigned to the receiver, a receiver in another radiant energy signaling system operating in the same service area will not be similarly protected. In fact, the simultaneous radiation of all the carriers of the first system at full power whenever one of them is modulated, will increase the probability of the capture of a receiver in the second system, particularly if its assigned carrier is not being continuously radiated. If this last-mentioned receiver is a mobile receiver and if it moves away from its base transmitter into the immediate vicinity of the transmitting point of the first system, then, even though its assigned carrier is being radiated continuously, the receiver will be captured by the carriers of the first system whenever the level of their intermodulation products that are applied to the limiter stage in the receiver exceeds the level of the similarly applied received assigned carrier. Capture under these last-mentioned circumstances is due to the fact that, when the intermodulation products and the received assigned carrier enter the limiter stage in the receiver, the limiter will discriminate in favor of the higher level intermodulation products and will substantially suppress the lower level carrier.

Accordingly, it is an object of this invention to provide a multichannel radiant energy system with means for reducing interference caused by intermodulation products of its carriers.

It is also an object of this invention to provide means for reducing undesired capture of a radiant energy receiver.

These and other objects of the invention are accomplished by reducing the power of unmodulated carriers, in a coordinated multichannel system of the type described above, to a level substantially lower than that employed when they are modulated. When these weak carriers enter the first stages of a receiver in another radiant energy signaling system, any intermodulation products which they may produce will be of such low intensity that they will be unable to seize control of the limiter stage in that receiver. It is to be understood that no reduction can be made in the power of the modulated carriers of the first system without reducing the service coverage area of that system. The reduction in the power of unmodulated carriers in the first system can be accomplished in various ways, one convenient method being to employ a relay connected in the coordinated transmitter starting circuits for disconnecting the plate voltage supply from the power amplifiers associated with the unmodulated transmitters while leaving the full screen voltage applied to these amplifiers and maintaining their cathodes at the normal operating temperature. By placing the power amplifiers in this condition, they function to attenuate energy supplied to them by their respective exciter units. For example, in one embodiment of the invention wherein the power output of the exciter unit was 20 watts, the output of the transmitter was reduced from a normal value of 250 watts to only one watt.

Figure 2:
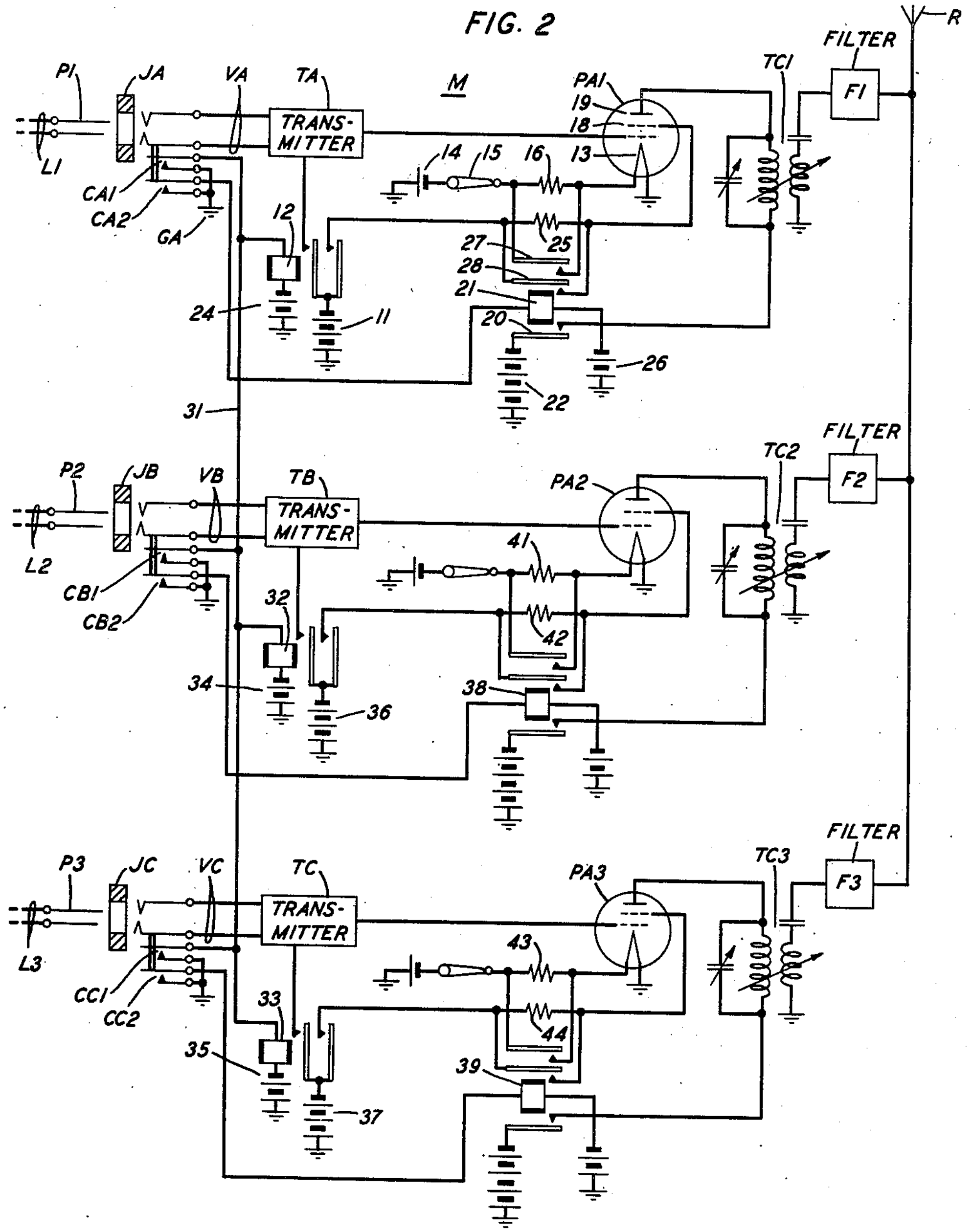

These and other features of the invention are more fully discussed in connection with the following detailed description of the drawing in which:

Fig. 1 is a schematic diagram of a plurality of radiant energy signaling systems operating in a common service area; and Fig. 2 is a circuit diagram of a multichannel signaling station.

In Fig. 1, a multichannel signaling system is represented as including a transmitting station M provided with a plurality of radio transmitters TA, TB, and TC adapted to generate carrier waves of respectively different mean frequencies FA, FB, and FC which are closely spaced from each other within an assigned portion of the frequency spectrum. The carrier waves produced by each of the transmitters TA, TB, and TC are supplied to the input of a power amplifier PA1, PA2, and PA3, respectively, which has its output connected to the input of a bandpass filter F1, F2, and F3, respectively. Each of the filters F1, F2, and F3 has its output connected to radiating means indicated at R which may comprise a plurality of antennas mounted on separate masts located at a common transmitting point or, if desired, may comprise a plurality of antennas mounted on a common mast. Carrier waves radiated by the radiating means R are received by a plurality of mobile radio receiving stations RA, RB, and RC disposed at various locations within the service area. Each of the mobile receivers RA, RB and RC is tuned to receive carrier waves produced by a respectively different one of the transmitters TA, TB, and TC. Thus, the receiver RA is tuned to receive carrier energy having the frequency FA, the receiver RB is tuned to the frequency FB, and the receiver RC is tuned to the frequency FC.

It is to be understood that this multichannel system may include a much larger number of mobile receiving stations divided into groups with all of the receivers in each of the groups being tuned to receive a carrier frequency which is different from that to which the receivers in the other groups are tuned to receive. It is also to be understood that this system may include a smaller or larger number of radio transmitters.

Fig. 1 also shows a single channel radiant energy communication system comprising a transmitting station S provided with a radio transmitter TD designed to produce carrier waves having a mean frequency FD which has a position in the frequency spectrum near the positions occupied by the frequencies FA, FB, and FC. The carrier waves produced by the transmitter TD are supplied to the input of a power amplifier PA4 which has its output coupled to an antenna R'. This single channel system also includes a mobile radio receiving station RD which is tuned to receive carrier energy having the frequency FD. It is to be understood that this system may include a plurality of mobile receivers all tuned to the frequency FD.

As is indicated in Fig. 1, there may be occasions when the mobile receiver RD moves away from its associated transmitting station S into the immediate vicinity of the radiating means R at the station M and thereby becomes subject to capture, in the manner described above, by carrier waves radiated therefrom. Such capture is reduced in accordance with this invention by reducing the power of unmodulated carriers transmitted from the station M. This may be accomplished in various ways, one convenient method being illustrated in Fig. 2.

In Fig. 2, each of the radio transmitters TA, TB, and TC at the multichannel station M is shown to be supplied with a signal input circuit VA, VB, and VC, respectively. Each of these signal input circuits is equipped with a jack JA, JB, and JC. The station M is also provided with a plurality of sources of modulating potentials constituted by a plurality of telephone wire lines L1, L2, and L3 carrying speech currents. Each of the wire lines L1, L2, and L3 is terminated in a plug P1, P2, and P3, respectively. Any one of the plugs P1, P2, and P3 may be inserted in any one of the jacks JA, JB, and JC for modulating the carrier energy produced by the respectively associated transmitter. The output energy of each of the transmitters TA, TB, and TC is delivered to an associated power amplifier PA1, PA2, and PA3, respectively, which has its output coupled by a tuned circuit TC1, TC2, and TC3, respectively, to a highly selective band-pass filter F1, F2, and F3, respectively. The output of each of the filters F1, F2, and F3 is delivered to radiating means R located at a common transmitting point.

Considering now the transmitter TA, its operating energy is derived from a 400 volt battery 11 over a circuit which, during idle conditions of the station M, is normally open at the inner armature and contact of a relay 12. Its associated power amplifier PA1 has its cathode 13 supplied with potentials from a 5 volt battery 14 over a circuit extending through a manually operable switch 15 and a resistor 16. The switch 15 is normally closed at the start of a business day and is opened at the end thereof. During idle periods of the station M, the battery 11 is also disconnected from the screen grid electrode 18 of the power amplifier PA1 by the normally open outer armature of relay 12. Also, during idle periods, the plate supply source, which is constituted by a 2,000 volt battery 22, is disconnected from the plate 19 of the power amplifier PA1 by the unoperated armature 20 of a relay 21. Thus, in the idle condition, both the transmitter TA and its associated power amplifier PA1 are disabled with the result that no useful energy is supplied through the tuned circuit TC1 to the antenna R.

When a message originating over one of the telephone lines, such as the line L1, is to be transmitted over the carrier generated by the transmitter TA, the plug P1 is inserted in the jack JA thus applying speech currents from the line L1 to the signal input circuit VA for modulating the frequency FA of the carrier waves produced by the transmitter TA. The insertion of the plug P1 into the jack JA causes an associated pair of control contacts CA1 and CA2 to become closed. Closure of the contact CA1 closes an obvious circuit for enabling current from battery 24 to energize relay 12 which accordingly operates its armatures. The operation of the inner armature of relay 12 closes the starting circuit of the transmitter TA thereby applying current from battery 11 to the transmitter TA. The operation of the outer armature of relay 12 connects the battery 11 through a resistor 25 to the screen grid 18 of the power amplifier PA1.

At the same time, the closure of the contact CA2 completes an obvious circuit for current from battery 26 to energize relay 21 which thereupon operates its armatures. The operation of the armature 20 of relay 21 completes an obvious circuit for applying voltage from battery 22 to the plate 19 of the power amplifier PA1. The operation of the armature 27 of relay 21 closes a shunt path across the resistor 16 in the filament supply circuit and the operation of the armature 28 closes a similar shunt path across the resistor 25 in the screen grid supply circuit. Thus, full operating potentials are applied to the electrodes of the power amplifier PA1 with the result that the modulated carrier waves produced by the transmitter TA will be radiated at their full strength of 250 watts.

When the contact CA1 became closed, it also applied ground GA over a conductor 31 to the energizing windings of relays 32 and 33 associated respectively with the transmitters TB and TC. This permitted current from batteries 34 and 35 to energize relays 32 and 33, respectively, which accordingly operated their armatures. The operation of the inner armatures of relays 32 and 33 closed the starting circuits of their respectively associated transmitters TB and TC and the operation of their outer armatures applied voltage from batteries 36 and 37 through the resistors 42 and 44 to the screen grids of the power amplifiers PA2 and PA3, respectively.

It is to be noted that since the contacts CB2 and CC2 are not closed at this time, their respectively associated relays 38 and 39 are not energized with the result that no plate voltage is applied to the power amplifiers PA2 and PA3 and the shunt paths across the resistors 41, 42, 43, and 44 remain open. Therefore, the filament potentials and screen grid potentials that are now applied to the power amplifiers PA2 and PA3 are of reduced value. In this embodiment of the invention, the full operating filament potential applied to the cathode 13 of the power amplifier PA1 is 5 volts and the reduced filament potential applied to each of the power amplifiers PA2 and PA3 is 4½ volts. Similarly, the full operating screen potential applied to the screen grid 18 in the power amplifier PA1 is 330 volts whereas the reduced screen grid potential applied to each of the power amplifiers PA2 and PA3 is 80 volts.

This absence of plate voltage together with the reduction in the filament and screen grid potentials applied to the power amplifiers PA2 and PA3 associated with the idle, or unmodulated, transmitters TB and TC causes the power amplifiers PA2 and PA3 to attenuate the carrier energy supplied to them from their respective transmitters TB and TC thereby effecting a substantial reduction in the radiated power of these unmodulated carriers. For example, in this embodiment of the invention wherein the power output of each of the transmitters TA, TB, and TC is 20 watts, the power output of the power amplifier PA1 operating with full electrode potentials is 250 watts whereas the power outputs of the power amplifiers PA2 and PA3 operating with no plate voltage and with reduced filament and screen grid potentials is approximately only 1 watt.

If the weak carrier waves from the unmodulated transmitters TB and TC are received by the receiver RD in the single channel system, they will be of such low intensity that they will produce substantially no intermodulation products. Any intermodulation products which they may produce will be of negligible strength and, in fact, will be of such low intensity that they will be unable to capture control of the limiter stage in the receiver RD.

Of course, if two or more of the transmitters TA, TB, and TC are modulated with signals at the same time, their respective carriers will be radiated at full strength and may produce undesirable intermodulation products within the first stages of the receiver RD. This cannot be avoided because any reduction in the power of the signal-modulated carriers would produce a considerably more serious difficulty; namely, a reduction in their service coverage area.

However, by reducing the power of unmodulated carriers transmitted from the multichannel station M, a considerable amount of interference is avoided that would otherwise be caused by intermodulation products of these carriers if they were radiated at full strength. Furthermore, the radiation of the unmodulated carriers at reduced strength provides the limiter stages in their associated mobile receivers with their respective assigned carriers at sufficient strength to enable the limiters to perform their characteristic function of excluding undesired energies and thereby preventing the capture of these receivers by intermodulation products of undesired carrier energies.

It is to be understood that this invention has been described above with reference to a specific multichannel system for the purpose of explaining its principles and features of operation and that the invention is not to be restricted to this particular embodiment but is to be limited only by the claims appended hereto.

What is claimed is:

1. A radiant energy signaling system comprising in combination a plurality of transmitters for producing carrier waves, radiating means for radiating said carriers, a plurality of sources of modulating energy, connecting means for selectively connecting said sources to said transmitters for selectively modulating said carriers, starting means responsive to the connection of at least one of said sources to one of said transmitters for effecting the radiation of all of said carriers by said radiating means, some of said radiated carriers being unmodulated, said system being characterized by having means for reducing interference caused by intermodulation products of said carriers, said last-mentioned means including control means for making the power of a carrier produced by a transmitter connected to one of said sources substantally greater than the power of a carrier produced by an unconnected one of said transmitters, and operating means responsive to the actuation of said connecting means for operating said control means.

2. In combination, a multichannel radiant energy signaling system having a plurality of radiant energy channels allotted thereto, said channels being closely spaced from each other within an assigned portion of the frequency spectrum, said system including a plurality of transmitters for generating carrier waves, the mean frequency of the carrier waves produced by each of said transmitters corresponding to that of a respectively different one of said channels, radiating means for radiating said carriers, a plurality of sources of modulating energy, connecting means for selectively connecting said sources to said transmitters for selectively modulating said carriers, starting means responsive to the connection of at least one of said sources to one of said transmitters for effecting the radiation of all of said carriers by said radiating means, some of said radiated carriers being unmodulated, a receiver tuned to a radiant energy channel adjacent to said plurality of channels, and control means for preventing the capture of said receiver by intermodulation products of carrier waves transmitted over said plurality of channels, said control means including impedance means for making the power of a carrier produced by an unconnected one of said transmitters substantially smaller than the power of a carrier produced by a transmitter connected to one of said sources.

3. In a multichannel radiant energy signaling system having a plurality of radiant energy channels allotted thereto, said channels being closely spaced from each other within an assigned portion of the frequency spectrum, a plurality of transmitters for generating carrier waves, the mean frequency of the carrier waves produced by each of said transmitters corresponding to that of a respectively different one of said channels, radiating means for radiating the carrier waves produced by each of said transmitters, said radiating means being located at a substantially common transmitting point, each of said transmitters having a signal input circuit and a normally disabled starting circuit, a plurality of independent sources of signaling energy, coupling means for coupling any one of said signal sources to any one of said transmitter input circuits for modulating the frequency of only the carrier energy generated by the coupled transmitter, control means actuated by the coupling of any one of said signal sources to any one of said input circuits for enabling all of said starting circuits to start all of said transmitters simultaneously for generating said carriers, some of said carriers being unmodulated, normally unoperated electroresponsive means adapted when operated to substantially increase the power of a carrier generated by a coupled one of said transmitters with respect to the power of a carrier generated by an uncoupled one of said transmitters, and operating means for operating said electroresponsive means, said operating means being responsive to the actuation of said coupling means.

4. A multichannel radiant energy signaling system comprising in combination a plurality of transmitters for producing carrier waves of respectively different mean frequencies, each of said transmitters having a signal input circuit and an output circuit, a source of signaling energy, coupling means for selectively coupling said source to one of said transmitter input circuits, at least one of said transmitter input circuits being uncoupled from said source, a plurality of thermionic amplifiers each having an input electrode coupled to a respectively different one of said transmitter output circuits, operating means for alternatively operating each of said amplifiers at a lower potential and a higher potential, and control means for selectively operating at the higher potential only the amplifier coupled to that transmitter which is in turn coupled to said source of signaling energy, said control means being responsive to the actuation of said coupling means.

5. A multichannel radiant energy signaling system in accordance with claim 4 wherein each of said thermionic amplifiers includes a plurality of electrodes, a plurality of voltage supply sources, at least one electrode of each of said thermionic amplifiers being normally uncoupled from any of said voltage supply sources, said operating means comprising switching means for selectively coupling said voltage supply sources to certain of said normally uncoupled electrodes, said operating means also including a plurality of voltage reducing elements, said control means including shunting means for selectively shunting certain of said voltage reducing elements.

6. A multichannel radiant energy signaling system in accordance with claim 5 wherein said shunting means include a plurality of electroresponsive devices, and energizing means responsive to the actuation of said coupling means for selectively energizing said electroresponsive devices.

7. A multichannel radiant energy signaling system comprising in combination a plurality of transmitters for producing carrier waves of respectively different mean frequencies, each of said transmitters having a signal input circuit and an output circuit, a plurality of sources of signaling energy, coupling means for coupling any one of said sources to any one of said transmitter input circuits, a plurality of thermionic amplifiers each having an input electrode coupled to a respectively different one of said transmitter output circuits, a plurality of voltage supply sources, a plurality of resistors, each of said amplifiers having a cathode coupled by a respectively different one of said resistors to a respectively different one of said voltage supply sources, each of said amplifiers having a screen grid electrode coupled to one end of a respectively different one of said resistors, each of said transmitters having a normally disabled starting circuit, a plurality of electroresponsive devices, each of said devices being adapted to effect the closing of a respectively different one of said transmitter starting circuits and also to effect the coupling of the other end of a respectively different one of said screen grid resistors to a respectively different one of said voltage supply sources, operating means actuated by the coupling of any one of said sources of signaling energy to any one of said transmitter input circuits for effecting the operation of all of said electroresponsive devices, each of said amplifiers having an anode, a plurality of normally open circuits each bridging a respectively different one of said resistors, a plurality of relays each associated with a respectively different one of said transmitters, each of said relays having a first armature adapted to connect a respectively different one of said anodes to a respectively different one of said voltage supply sources, each of said relays also having a second armature adapted to close a respectively different one of said normally open circuits bridging a respectively different one of said cathode resistors, each of said relays also having a third armature adapted to close a respectively different one of said normally open circuits bridging a respectively different one of said screen grid electrodes, and control means actuated by the coupling of any one of said sources of signaling energy to any one of said transmitter input circuits for effecting the energization of only that one of said plurality of relays which is associated with the signal-coupled transmitter.

ROBERT WILLIAM CARTER.
MILTON GRIFFITH CURRIER.
WILLIAM GEORGE EMIG.
KENNETH VERLEY GLENTZER.

References Cited in the file of this patent

UNITED STATES PATENTS

| Number | Name | Date |
|---|---|---|
| 1,319,068 | Hammond, Jr. | Oct. 21, 1919 |
| 1,721,567 | Martin | July 23, 1929 |
| 1,797,746 | Young | Mar. 24, 1931 |
| 2,099,787 | Wright | Nov. 23, 1937 |
| 2,382,567 | Hollingsworth | Aug. 14, 1945 |